June 29, 1954     N. T. BALDANZA ET AL     2,682,196
SPECTACLE MOUNTING

Filed Nov. 20, 1951     2 Sheets-Sheet 1

INVENTORS
NICHOLAS T. BALDANZA
CHARLES CASTELLI
their ATTORNEY

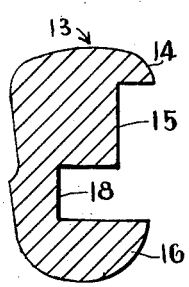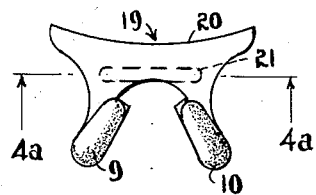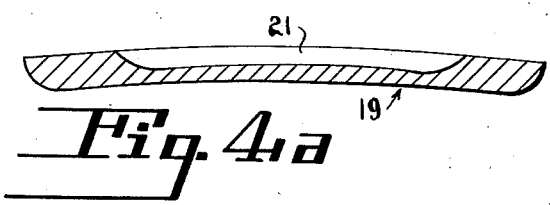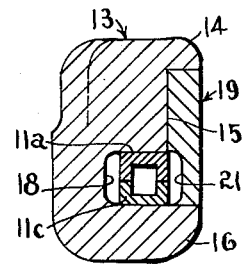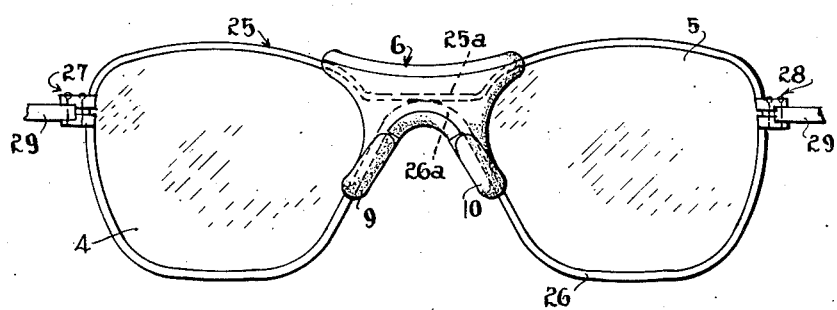

Patented June 29, 1954

2,682,196

UNITED STATES PATENT OFFICE 2,682,196

SPECTACLE MOUNTING

Nicholas T. Baldanza, Rutherford, and Charles Castelli, Hasbrouck Heights, N. J., assignors to Curtiss-Wright Corporation, a corporation of Delaware Application November 20, 1951, Serial No. 257,254

3 Claims. (Cl. 88—41)

This invention relates to spectacle mountings of the metal-plastic type, and in particular to spectacle mountings having special application to sun glasses or goggles, although not limited thereto.

In a well-known type of sun glasses having metal frames, the frame is reinforced by an auxiliary bridge bar, sometimes referred to as a "sweat bar," welded to and extending between the top portions of the metal rims. The bridge and individual nose pads are welded or secured to the rims generally in conventional manner by separate operations so that the fabrication of this type of sun glasses is comparatively expensive. Furthermore, by reason of high mechanical stresses that may occur at the welded joints between the bridge bar and rims due to bending or rough handling, this construction is not as rugged and reliable as a well made single-piece molded plastic frame.

A principal object of the present invention therefore, is to provide an improved spectacle mounting combining advantages of both metal and plastic mountings that is efficient and comfortable in use, pleasing in appearance, simple, inexpensive and rugged in construction and adaptable for general use, especially for sun glasses or goggles.

A more specific object is to provide in combination with a resilient metal rim lens frame an improved unitary plastic nose pad and bridge structure that forms with the comparatively resilient metal frame a rigid unitary structure capable of imparting rigidity to the frame as a whole and thereby securely locking the lenses within the lens frame.

This invention will be more fully set forth in the following description referring to the accompanying drawings, and the features of novelty which characterize the invention will be pointed out with particularity in the claims annexed to and forming a part of this specification.

Referring to the drawings, Fig. 1 illustrates the face side of spectacle mountings embodying the present invention as applied to sun glasses;

Fig. 3a is an enlarged sectional view taken along the line 3a—3a of Fig. 3;

Fig. 4 is a detailed view of another molded plastic member comprising the face part of the bridge piece;

Fig. 4a is an enlarged sectional view taken along the line 4a—4a of Fig. 4;

Fig. 5 is an enlarged sectional view taken along the line 5—5 of Fig. 1; Fig. 6 illustrates the face side of a modified form of the spectacle frame structure providing for lens replacement.

Figure 1:
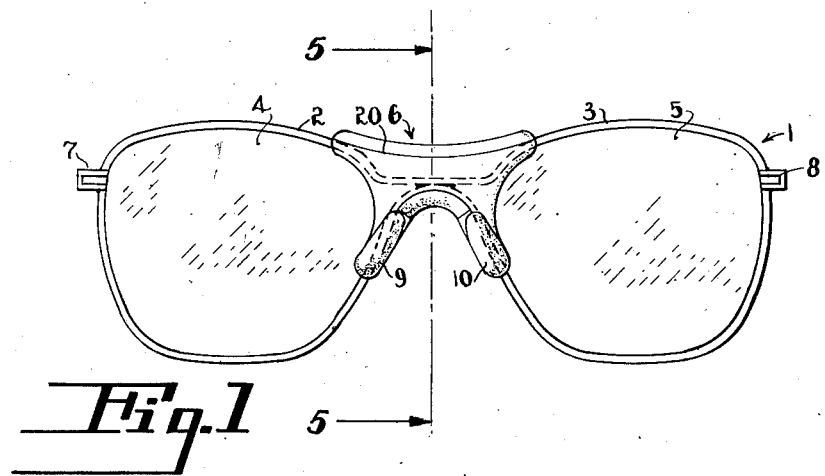

The spectacle mounting shown in Fig. 1 is of the metal plastic type and comprises a metal frame 1 forming a pair of rim frames 2 and 3 for the lenses 4 and 5 respectively. The rim frames are reinforced and integrally united by a preformed metal-plastic bridge structure 6 hereinafter described, and the frame 1 has suitably connected thereto, as by welding or soldering, the bracket members 7 and 8 on which the temples (not shown) are pivotally mounted in conventional manner. The spectacle bridge 6 comprises molded plastic material of suitable composition, such as one having a styrene or acetate base, integrally united to and enclosing the opposite sides, i. e., the front and face sides of the metal bridge frame. The plastic material is also firmly secured to the adjacent portions of the rim frames, so as to constitute a rigid unitary bridge piece between the rim frames. The plastic material of the bridge is preformed as shown in Fig. 1 to provide nose pads 9 and 10 of suitable configuration at the face side of the frame.

Figure 2:
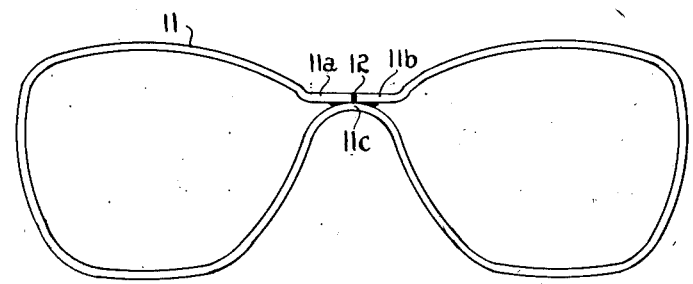
Fig. 2 illustrates the metal structure forming the rim and bridge frames.

The method of fabricating the above described spectacle mounting is as follows according to a preferred form of the invention:

The metal frame 1, referring to Fig. 2 is formed by shaping by means of a suitable fixture a single metal strip 11 in a substantially continuous double loop to form the lens frames. The middle section of the loop is shaped and drawn together so as to form the bridge frame which is made integral by welding or soldering together the opposite portions of the loop at 12. The end portions 11a and 11b of the metal strip are also preferably united to each other at the center of the bridge frame and to the lower central portion 11c of the loop as illustrated. The metal strip 11 may be of channel cross-section shape as illustrated in Fig. 6 for mounting the lenses which, after being inserted in the rim frames are held in place as the portion 11c is shaped to tighten the frame by contracting the loops forming the rim frames.

In a frame structure so far described the inherent flexibility of the metal frame would, due to flexing of the structure in normal use, result in inadequate retention of the lenses. In other words, additional rigidity must be imparted to the frame for holding the lenses securely in position. Also additional structure must be provided for insuring that the spectacle mounting is comfortable for the wearer as well as presentable.

For this purpose a molded plastic structure is united to the bridge frame and to adjacent portions of the rim frames, in the following manner; a molded plastic member 13, Fig. 3 shaped so as to fit snugly on the bridge frame and adjoining portions of the rim frames is placed on the front side of the spectacle mounting. To this end, member 13 has on its inner or face side an arcuate upper overhanging portion or lip 14 defining the upper edge of the bridge piece, three planar shoulder portions 15, 15a and 15b and an arcuate ridge-like portion 16 that is generally in vertical alignment with the lip 14. As shown by Fig. 3a the aforesaid portions 14 and 16 extend somewhat beyond the planar shoulder portions.

Figure 3:
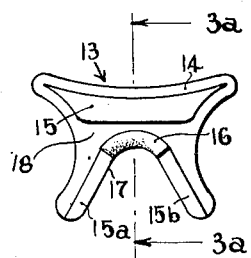
Fig. 3 is a detail view of a molded plastic member comprising the front part of the bridge piece.

As shown in Fig. 3 the member 13 is shaped at its lower edge to form a curved recess 17 for the nose when the spectacles are in use and the sides of the member are shaped generally to conform to the rim frames. It will be noted that the member 13 is recessed at 18 so as to receive in proper fitting relation the bridge frame portions 11a, 11b and 11c as well as the adjoining portions of the respective rim frames. When so fitted on the frame, with the bridge frame seating in the recess 18 as shown by Fig. 6, the plastic member 13 is in snug fitting relation thereto.

The bridge piece is completed by cementing or otherwise integrally securing another molded plastic member 19 to the member 13 at the face side of the spectacle mounting so as substantially to enclose the bridge frame and the adjoining portions of the rim frames. A solvent cement for integrally uniting the surfaces is preferably used. For this purpose, the plastic member 19 is shaped so that its upper part lies flush with the lip 14 on the shoulder 15 of the plastic member 13 and the edge 20 makes a snug fit with the lip as illustrated by Fig. 6. The surfaces that are cemented together comprise the planar shoulders 15, 15a and 15b of the member 13, and the opposing planar surface of the member 19. The latter is provided with a suitable recess 21 for insuring clearance with the bridge frame and the face side of this member has formed thereon the nose pads 9 and 10 above referred to. As previously described the side of member 19 opposite the nose pads is planar for cementing to the shoulders 15a and 15b of the member 13. As shown by Fig. 4a the face side of member 19 is slightly concave to conform easily to the face in use. Thus the member 19 functions generally as a cover structure for both completing and reinforcing the bridge piece as well as providing a comfortable nose mounting for the user. The bridge plastic structure is designed so that the members 13 and 19 fit together accurately with no sharp corners or edges protruding. The exterior surface on both sides of the bridge is smooth and gently contoured.

In the split-frame modification which is also adaptable for prescribed optical and sun glass lenses shown by Fig. 5, the metal frame is composed of two strips 25 and 26 that are shaped and joined together at the bridge frame portions 25a and 26a to form the bridge frame and rim frames generally in the same manner as above described. However, in this instance the adjoining ends of the strips are connected to conventional temple brackets 27 and 28 for pivotal connection with the temples 29 in the usual manner. The plastic bridge piece 6 can be integrally joined to the bridge and rim frames in the manner above described for imparting strength and rigidity to that part of the spectacle mounting while allowing for lens replacement in the usual manner by loosening the rim frames at the temples.

It should be understood that this invention is not limited to specific details of construction and arrangement thereof herein illustrated, and that changes and modifications may occur to one skilled in the art without departing from the spirit of the invention.

What is claimed is:

1. The method of fabricating a spectacle mounting for a pair of lenses which comprises shaping a single metal strip so as to form lens enclosing rim frames and uniting the ends of said strip between the rim frames to form a substantially continuous loop and integrally joining the opposing portions of said loop between said lenses including the ends of said strip to form the bridge frame, fitting a plastic member to said bridge frame and to adjacent portions of the respective lens frames substantially to enclose one side thereof, and molding a complementary plastic member to said bridge member at the opposite side of said bridge frame to form therewith a rigid integral bridge piece.

2. A spectacle mounting of the metal-plastic type for a pair of lenses comprising a metal frame encircling and common to each lens to form rim frames, the upper and lower portions of said rim frames respectively between said lenses being shaped and united to form a bridge frame, and a plastic structure integrally united to said bridge frame and adjoining portions of said rim frames, said plastic structure comprising a grooved piece for receiving said bridge and rim frames at the outer side of the spectacle mounting and a complementary piece including nose pads molded to said grooved piece to enclose the respective portions of said frames thereby to form an integral spectacle bridge and nose piece adapted to hold the spectacle frame rigidly in lens-retaining position.

3. A spectacle mounting of the metal-plastic type for a pair of lenses comprising a metal frame encircling and common to each lens to form rim frames, the upper and lower portions of said rim frames respectively between said lenses being shaped and united to form a bridge frame, and a plastic structure integrally united to said bridge frame and adjoining portions of said rim frames, the plastic structure having nose pads formed thereon, said plastic structure comprising a grooved piece for receiving said bridge and rim frames at one side of the spectacle mounting and a complementary piece molded to said grooved piece to enclose respective portions of said frames thereby to form an integral spectacle bridge and nose piece adapted to hold the spectacle frame rigidly in lens-retaining position.

References Cited in the file of this patent

UNITED STATES PATENTS

| Number | Name | Date |
| --- | --- | --- |
| 502,782 | Spencer | Apr. 8, 1893 |
| 536,248 | Willson | Mar. 26, 1895 |
| 1,453,814 | Van Tassel | May 1, 1923 |
| 1,635,867 | Tully | July 12, 1927 |
| 2,354,603 | Malcom | July 25, 1944 |
| 2,463,041 | Malcom | Mar. 1, 1949 |